Patented Oct. 12, 1954

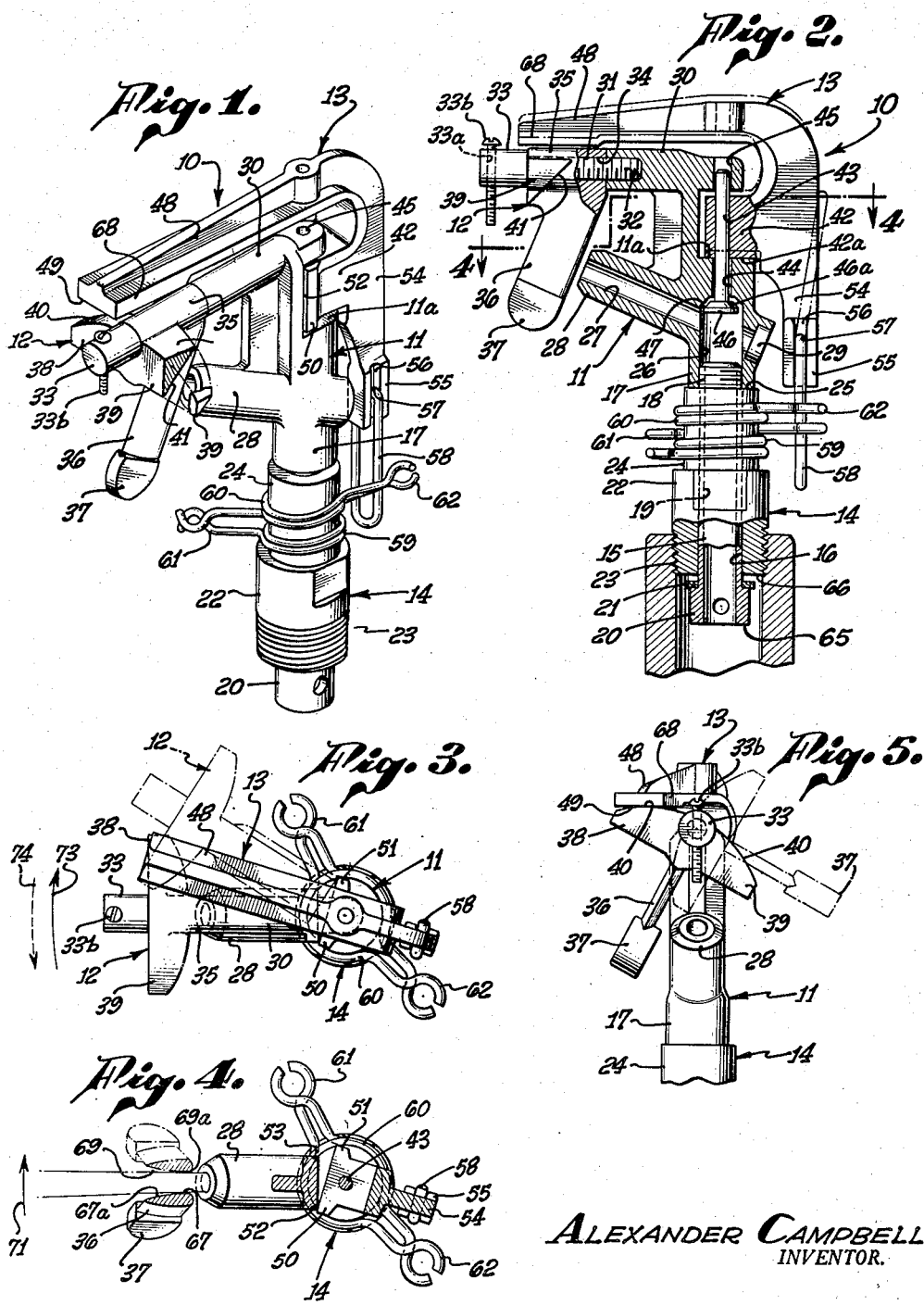

2,691,547

UNITED STATES PATENT OFFICE 2,691,547

ROTARY IRRIGATION DEVICE

Alexander Campbell, Pasadena, Calif.

Application July 3, 1952, Serial No. 297,030

9 Claims. (Cl. 299—71)

This invention relates to an irrigation device and more particularly to an irrigation device of the rotary, fractional arc type, that is adapted to provide step by step rotary disposition of water over an area to be irrigated.

It has been found that proper irrigation of an area, such as lawns, gardens and some shrubs, requires that water be delivered to the area in a gently falling manner similar to rain. The water so delivered must also be allowed to penetrate the earth rather than merely accumulating on the surface to pack the earth and wastefully run off. As an answer to these problems, irrigation devices have been produced that will swing from side to side and distribute a single jet of water radially therefrom. This action permits intermittent irrigation of an area therefore allowing the water to penetrate the soil. As a single water nozzle, or multiple nozzles in vertical parallel displacement, is used, a relatively large area may be irrigated at one time thus eliminating the necessity for close installation of the devices or frequent movement of a non-permanently installed device.

It has also been found that such devices may be made to operate within a segment of a circle thus enabling the irrigation of a bordered area without disposing water over areas where such is not desired.

Heretofore many devices of this nature have been proposed and used. In many cases these devices were extremely complex and included operating parts that frequently became worn, were easily damaged or the construction was such as to necessitate frequent adjustment for continued operation. The use of coil and leaf springs in connection with the operating parts has also created several problems. These springs were necessary due to hard working parts and often took on a permanent set, became weakened or broke, due to the corrosive action of water, and therefore had to be frequently replaced. Sealing means within the prior devices have also given considerable trouble as it is often necessary to replace such seals in inaccessible bores and the like. Due to the number of parts and difficulties of manufacture, assembly and adjustment, prior similar devices have necessarily been expensive.

It is therefore one object of the present invention to provide a novel irrigation device of such a construction as to overcome the aforesaid difficulties.

Another object of the invention is to provide a novel irrigation device which will produce positive step-by-step rotation and distribution of water in either a full circle or any predetermined fractional segment thereof.

Another object of the invention is to provide a novel means for producing step-by-step rotation of an irrigation device by utilizing the force of a jet of water from said device to produce rhythmic impulses in the plane of rotation of the device.

A further object of the present invention is to provide novel means for reversing the direction of rotation of a rotary irrigation device.

A still further object of the invention is to provide a novel irrigation device of compact construction and containing as few parts as may be necessary for positive reliable operation.

A further object of the invention is to provide a novel irrigation device of such a construction as to enable smooth, efficient and easily operating components.

My invention has many other objects, advantages, and features, some of which, with the foregoing, will be set forth in the following description where I shall outline one form of my invention which I have selected for illustration in the drawings accompanying and forming a part of the present specification.

In the drawings:

Fig. 1 is an isometric view of the improved irrigation device of the present invention;

Fig. 2 is a side elevational view of the irrigation device, partly in section;

Fig. 3 is a top plan view of the irrigation device, alternate position of some parts being shown;

Fig. 4 is a sectional view taken as indicated by line 4—4 of Fig. 2; and

Fig. 5 is a fragmentary front view of the impulse and driving members of the irrigation device.

Referring to the drawing by reference characters, and referring primarily to Figs. 1 and 2, the irrigation device is indicated generally at 10 and includes generally, an irrigating head 11, an impulse member 12, pivotally secured to the head 11, a driving member 13, and a supporting head or base 14.

The head 11 is adapted to be supported upon the base 14 for rotary movement thereon. A hollow shaft 15 extends through an opening 16 in the base 14 and threadably engages the lower portion 17 of the head 11 as at 18. A bore 19 within the shaft 15 provides communication between an enlarged lower end 20 of the shaft 15, which lower end supports a resilient seal 21.

Base 14 further includes an enlarged lower portion 22, having threads 23, which are adapted to be secured in any suitable structure as, for example, a supporting base, to which a garden hose may be attached, or the base may be attached to a permanently installed water conduit. The member 14 also includes a reduced diameter upper portion 24, which presents an upwardly directed shoulder 25, upon which the portion 17 of the head is adapted to normally rest.

The bore 19 in the shaft 15 communicates with an axial bore 26 in the head 11. A substantially transverse bore 27 extends radially from the bore 26 and into a nozzle 28. One end of the bore 27 may be plugged as at 29 so that water delivered through the bore 19 will pass into the bores 26 and 27 and be discharged through the nozzle 28.

An upper portion 30 of the head 11 threadably supports a shaft 31 as at 32. The shaft 31 extends outwardly from the portion 30 and is provided with an enlarged head 33. A small vertical threaded bore 33a is provided in head 33 of shaft 31 to carry a small screw 33b of conventional construction. Screw 33b may be threaded downwardly as shown until its threaded end projects into the jet of water issuing from nozzle 28. In this position the screw effects a divergence of the jet from nozzle 28 into two streams of water. This provides a saturating spray of somewhat shorter radius than is normally produced from the nozzle 28. If desired the screw 33b may be threaded into the bottom of bore 33a such that the head of the screw projects into the stream of water breaking it into a very fine saturating spray of very short radius. The shaft 31 is adapted to rotatably support the impulse member 12 intermediate the head 33 and the portion 30, the impulse member 12 being provided with an axial bore 34 within impulse body 35 for the reception of the shaft 31. The bore 33 is positioned on the axis of the head 11 in order that the impulse member 12 will operate freely. It has been found that this arrangement allows the impulse member to rotate about an axis most desirable for the best action of the member.

The body 35 is provided with a downwardly extending vane 36, which is substantially air foil shaped in cross-section and which is positioned adjacent the nozzle 28 so as to be engaged by a jet water from the nozzle 28. A weighted portion 37 is formed on the lower end of the vane 36, the purpose of which will be later described. The impulse member 12 further includes laterally extending deflection members 38 and 39. These deflection members extend substantially beyond the impulse body 35 and have arcuate upper surfaces 40. The deflection members 38 and 39 are substantially triangular in cross-section, and have angular water deflection surfaces 41, these surfaces being disposed at an angle to the axis of the shaft 31.

The driving member 13 has a central portion 42, which is rigidly secured to a pin 43. The pin 43 is journalled and adapted to slide vertically in aligned bores 44 and 45 in the head 11, these bores being coextensive with the bore 26. A head 46 having a frustro-conical portion 46a is arranged on the lower end of the pin 43 and is adapted to be selectively seated in a frustroconical recess 47 in the upper end of the bore 26. It may thus be seen that assembly of the driving member with the irrigation head may be readily accomplished by the insertion of the pin 43 through the bore 26 and bores 44 and 45, the pin 43 having a drive fit in the portion 42 of the driving member, so as to permit the driving member 13 to be freely rotatable about the axis of the head.

The pin 43 fits slidingly in bores 44 and 45 respectively, and when water pressure is applied to the lower surface of head 46, the pin 43 and driving member 13 are displaced vertically upward, seating head 46 in recess 47 as shown by the broken line in Fig. 3. This displacement creates a separation between the lower face 42a of portion 42 and the opposing face 11a of head 11.

It should be noted that in all cases the pressure which the frustro-conical surface 46a of the head of pin 43 exerts against its frustro-conical recess 47 is proportional to the water pressure exerted on the end of the pin head. This bearing pressure of pin head 46 in its seat 47 results in a frictional torque opposing movement of driving member 13 relative to head 11. Since the force of the jet of water from nozzle 28 and the force it exerts on impulse member 12 is proportional to the water pressure it is noted that the force with which deflector 38 of impulse member 12 strikes driving member 13 is proportional to the water pressure. Therefore, the frictional torque exerted by the pressure of pin head 46 in its seat 47 increases proportionately with the forces exerted by impulse member 12 on driving member 13, thus opposing the tendency of driving member 13 to move relative to head 11 as the arm is struck by impulse member 12. Driving member 13 and head 11 are therefore locked in driving position, as shown in Fig. 4, until the tail piece 58 strikes the extending portions 61 or 62, of the stop wires as hereafter described.

The driving member 13 further includes a radially extending arm 48 adapted to overlie the portion 30 of the head and to be positioned adjacent the impulse member 12, the arm 48 having a downwardly directed impulse surface 49, adapted to be engaged by the surfaces 40 of the deflection members 38 or 39. This engagement is such that the surface 49 will be engaged by the surfaces 40 along a line tangent to said surfaces thus making a line contact therewith as shown in Fig. 5. In order to position the arm 48 so that the surface 49 will be engaged by one or the other of the surfaces 40 of the deflection members 38 or 39, a pair of wings 50 and 51 are provided on the central portion 42 of the driving member. These wings 50 and 51 are adapted to engage stops 52 and 53, Fig. 4, to thereby limit the angular rotation of the driving member 13 relative to head 11. It will be noted that the wings 50 and 51 are positioned as close to the axis of the head 11 as possible, thereby eliminating the necessity of long wings which may be easily broken off and to substantially eliminate any tendency of the impulse member 12 to rotate the head 11 when the member 12 is moved from one position to the other.

The driving member 13 further includes a downwardly extending direction reversing portion 54, the lower end of which is adapted to rotate, within the limits of the ends 61 and 62 of stop wires 59 and 60, about the lower end 17 of the head 11 and is provided with an enlarged portion 55, having oppositely positioned spaced grooves 56. A hole 57 in the base of the grooves 56 is adapted to receive the ends of a wire reversing member 58, this member 58 being manually adjustable to extend downwardly from the portion 55 to be positioned adjacent the enlarged portion 22 of the base 14 as shown in Fig. 1. A pair of short helical stop wires 59 and 60 are positioned about the portion 24 of the base 14 and have their ends 61 and 62 extended radially from the portion 24. The tension of the stop wires 59 and 60 is such as to cause their spring portion to grip the portion 24 of the base in such a manner as to hold these wires in position while still permitting them to be manually rotatably moved on the portion 24, the ends 61 and 62 being adapted to be engaged by the wire reversing member 58, the purpose of which will be later described.

In use, water is delivered through the bore 19 and bores 26 and 27 to be discharged through the nozzle 28. The force of the water jet against the lower surface 65, Fig. 2, of the enlarged lower end 20 of the shaft 15 will cause the shaft 15 together with the head 11 to be moved upwardly so that the resilient seal 21 will be brought into engagement with the lower surface 66 of the portion 22 of the base 14. The slight frictional engagement of the seal 21 with the surface 66 will retain the head 11 normally against rotation.

The jet of water from the nozzle 28 will engage the vane 36 at its leading surface 67 and the construction and shape of the vane 36 is such as to create a vacuum on the leading surface adjacent to the front edge of the vane, as indicated at 67a in Fig. 4, which vacuum draws the vane 36 through and past the center of the jet of water to the position indicated by the broken line, whereupon a force or increased pressure is created by the jet of water on the trailing surface 69 of the vane at or near its back edge 69a, said pressure driving the impulse member 12 out of the jet of water, as indicated by arrow 71. Regardless of from which direction the impulse member 12 approaches the jet of water, the vacuum and force above described is created on the vane 36 and drives it through the jet, oscillating impulse member 12. The upper surfaces 40 will next be brought into use to position the arm 48 of the driving member 13 so that the surface 49 will overlie one of the surfaces 40 of the deflection members 38 or 39. This action is accomplished by the engagement of one of the surfaces 40 with a side portion 68 of the arm 48 to thereby cam the arm 48 in one direction until such motion is stopped by one or the other of the stops 52 or 53.

Assuming that the driving member 13 and the arm 48 are in the position shown in Fig. 1, the initial oscillation of the impulse member 12 will be such as to force the arm 48 into its extreme clockwise end position.

Thereafter the impulse member being alternately under the influence of the jet of water from nozzle 28 and struck by surface 49 of driving member 13, will rapidly oscillate, allowing weighted portion 37 formed at the end of vane 36 to move alternately in reverse directions in an arc limited by the action of the jet of nozzle 28 on deflector 38 and the action of the same deflector 38 on striking surface 49 as seen best in Fig. 5. As the impulse member is rapidly rotated to the striking surface 49 of driving member 13, considerable angular momentum is induced in impulse member 12 and its appended weight 37, and as the weight moves to and through the most downwardly portion of its arc, surface 40 of deflector member 38 strikes driving member 13. The resultant sudden deceleration of the rotational movement of weight 37 results in the translation of its momentum to cause slight rotational movement of driving member 13 and its supporting head 11 in the place of rotation of head 11 about its shaft 15. Deflector member 38 after striking driving member 13, falls back until vane 36 engages the jet of water from nozzle 28 and is drawn through the jet as described above, until the angularly disposed water jet engaging surface of deflector 38 engages the jet of water from nozzle 28. Thereupon the jet exerts a tangential force on the deflector surface to oppose and reverse the movement of impulse member 42 to drive it until vane 36 again engages the water jet. The jet draws vane 36 through it increasing the angular speed of the impulse member 12 as above described. As the rapid successive movements of impulse member 12 is stopped by the contact of deflector 38 with arm 48 the momentum of swinging weighted portion 37 of vane 36 overcomes the inertia of head 11 to move it counterclockwise in a step-by-step rotation against the slight frictional resistance of seal 21 against surface 66.

The line contact between the surfaces 40 and the surface 49 causes the arm 48 to be merely struck and in no case will the arm be moved relative to the irrigation head 11 until the end of a predetermined arc is reached as when the sprinkler is adjusted for irrigating a partial arc.

When wire reversing member 58 is moved to its downwardly extending position on reversing portion 54 of member 13, and the head 11 approaches the end of its counterclockwise rotary movement, the reversing wire 58 will engage the radially extending end 61 of the spring 59 and will arrest movement of the arm 48, but head 11 under the influence of weighted vane 36 continues to move until it reaches the other side of the driving member as shown by the broken line in Fig. 3. Arrows 73 and 74 indicate the direction of rotation of head 11 with the respective relative positions of the head 11 and driving member 13 shown in Fig. 3.

It is to be noted that the ends 61 and 62 of the stop wires 59 and 60 may be manually positioned at any desired radial relationship to each other, so that any predetermined segment of a circle may be irrigated. It is also to be noted that the wire 58 may be swung upwardly to the position shown by the dotted lines in Fig. 2, so as to cause the head to be continuously rotated about a complete circle, when the character of the irrigation problem is such that it may be desirable to cover a complete circular area.

From the foregoing description taken in connection with the accompanying drawings, the uses, advantages, and operation of my invention will be readily understood by those skilled in the art to which the invention appertains. I desire to have it understood that the form shown is merely illustrative and that the invention is not to be limited to the details disclosed herein, but is to be accorded the full scope of the appended claims.

I claim:

1. A rotary irrigation device comprising an irrigation head mounted for rotation about a vertical axis; a nozzle extending radially from said head, an impulse member pivotally mounted to said head, said impulse member including a downwardly extending foil shaped vane and a depending weight attached to said vane, said vane positioned to normally interrupt a jet of water from said nozzle whereby said water jet will cause oscillation of said impulse member; water deflection members projecting laterally from said impulse member; a driving member pivotally mounted on said head and having a portion positioned adjacent said impulse member; and means for limiting the angle of rotation of said driving member relative to said irrigation head to cause said portion of sadi driving member to be respectively positioned adjacent either of said deflection members whereby said adjacent deflection member will strike said portion of said driving member upon oscillation of said impulse member, to suddenly arrest the motion of said weighted vane, to allow the momentum of said weighted vane to apply a torque to said head to turn same about its said vertical axis.

2. A rotary irrigation device comprising an irrigation head mounted for rotation about vertical axis; a nozzle extending radially from said head; an impulse member having a downwardly extending vane positioned to normally interrupt a jet of water from said nozzle whereby the action of said vane will cause oscillation of said impulse member; a depending weight formed at the end of said vane; water deflection members projecting laterally from said impulse member, a driving member pivotally mounted on said head and having a portion positioned adjacent said impulse member; and means for limiting the angle of rotation of said driving member to cause said portion of said driving member to be selectively positioned adjacent either of said deflection members to be struck by said adjacent deflection member upon oscillation of said impulse member, to suddenly arrest the motion of said weighted vane to allow the momentum of said vane to apply a torque to said head rotating same about its said vertical axis towards said driving member to impart step-by-step rotation to said head.

3. An irrigation device according to claim 1, in which said impulse member is pivotally mounted on a horizontal axis intersecting the rotational axis of said head.

4. A rotary irrigation device comprising: an irrigation head mounted for rotation about a vertical axis; a nozzle extending radially from said head; an impulse member pivotally mounted to said head, said impulse member having a downwardly extending vane positioned to normally interrupt a jet of water from said nozzle whereby the action of said jet against said vane will cause oscillation of said impulse member said vane being formed with a downwardly depending weight; water deflection members projecting laterally from said impulse member; a driving member pivotally mounted on said head and having a horizontally extending arm positioned adjacent said impulse member; a vertically disposed direction reversing portion on said driving member positioned adjacent said head; laterally extending wings on said reversing portion; and stops on said head adapted to be engaged by said wings to thereby limit the angle of rotation of said driving member relative to said irrigation head to cause said arm to be selectively positioned adjacent one of said deflection members whereby said adjacent deflection member will strike said arm upon oscillation of said impulse member to suddenly arrest the motion of said weighted vane to allow the momentum of said impulse member and its weighted vane to apply a torque to said head to rotate said head about its vertical axis towards said driving member, said successive oscillations of said impulse member imparting step-by-step rotation to said head.

5. An irrigation device according to claim 4, including means to reverse the direction of rotation of said head to rotate alternately in a clockwise and counterclockwise direction within a predetermined arc.

6. An irrigation device according to claim 4, including means engageable by said direction reversing portion to arrest the rotation of said driving member to allow said head to travel under said driving member and position the other of said deflection members adjacent said striking portion of said arm member to thereby cause said arm member to reverse the direction of rotation of said head, to cause said head to rotate alternately in a clockwise and counterclockwise direction within a predetermined arc.

7. An irrigation device according to claim 4, including means associated with said reversing portion and said engageable means to permit selection of either arcuate or circular travel of said irrigation device.

8. A rotary irrigation device comprising: an irrigation head mounted for rotation about a vertical axis; a nozzle extending radially from said head on an axis intersecting the rotational axis of said head; an impulse member pivotally mounted to said head, said impulse member having a downwardly extending vane positioned to normally interrupt a jet of water from said nozzle whereby the action of said jet against said vane will cause oscillation of said impulse member, said vane being formed with a downwardly depending weight; water deflection members projecting laterally from said impulse member; a driving member pivotally mounted on said head and having a horizontally extending arm positioned adjacent said impulse member; a vertically disposed direction reversing portion on said driving member positioned adjacent said head; laterally extending wings on said reversing portion and positioned adjacent the axis of said head; stops on said head adapted to be engaged by said wings to thereby limit the angle of rotation of said driving member relative to said irrigation head to cause said arm to be selectively positioned adjacent one of said deflection members whereby said adjacent deflection member will strike said arm upon oscillation of said impulse member, to suddenly arrest the motion of said weighted vane to allow the momentum of said impulse member and its weighted vane to apply a torque to said head to rotate said head about its vertical axis towards said driving member, said successive oscillations of said impulse member imparting step-by-step rotation to said head; means engageable by said direction reversing portion to arrest the rotation of said driving member to allow said head to travel under said driving member and position the other of said deflection members adjacent said striking portion of said arm member to thereby reverse the direction of rotation of said head, to cause said head to rotate alternately in a clockwise and counterclockwise direction within a predetermined arc; and means associated with said reversing portion and said engageable means to permit selection of either arcuate or circular travel of said irrigation device.

9. A rotary irrigation device comprising: an irrigation head mounted for rotation about a vertical axis; a nozzle extending radially from said head; an impulse member pivotally mounted to said head, said impulse member having a downwardly extending vane positioned to normally interrupt a jet of water from said nozzle whereby the action of said jet against said vane will cause oscillation of said impulse member said vane being formed with a downwardly depending weight; water deflection members projecting laterally from said impulse member; a driving member pivotally mounted on said head and having a horizontally extending arm positioned adjacent said impulse member and means to lock said arm to said head including hydraulic means responsive to the pressure of the fluid in said irrigation device; a vertically disposed direction reversing portion on said driving member positioned adjacent said head; laterally extending wings on said reversing portion; and stops on said head adapted to be engaged by said wings to thereby limit the angle of rotation of said driving member relative to said irrigation head to cause said arm to be selectively positioned adjacent one of said deflection members whereby said adjacent deflection member will strike said arm upon oscillation of said impulse member to suddenly arrest the motion of said weighted vane to allow the momentum of said impulse member and its weighted vane to apply a torque to said head to rotate said head about its vertical axis towards said driving member, said successive oscillations of said impulse member imparting step-by-step rotation to said head.

References Cited in the file of this patent

UNITED STATES PATENTS

| Number | Name | Date |
|---|---|---|
| 1,180,526 | Partridge | Apr. 25, 1916 |
| 2,047,348 | Wilson | July 14, 1936 |
| 2,064,072 | McArdle | Dec. 15, 1936 |
| 2,254,270 | Coles | Sept. 2, 1941 |
| 2,309,782 | Orr | Feb. 2, 1943 |
| 2,323,701 | Barksdale | July 6, 1943 |
| 2,421,551 | Dunham | June 3, 1947 |
| 2,596,383 | Dunham | May 13, 1952 |